UNITED STATES PATENT OFFICE.

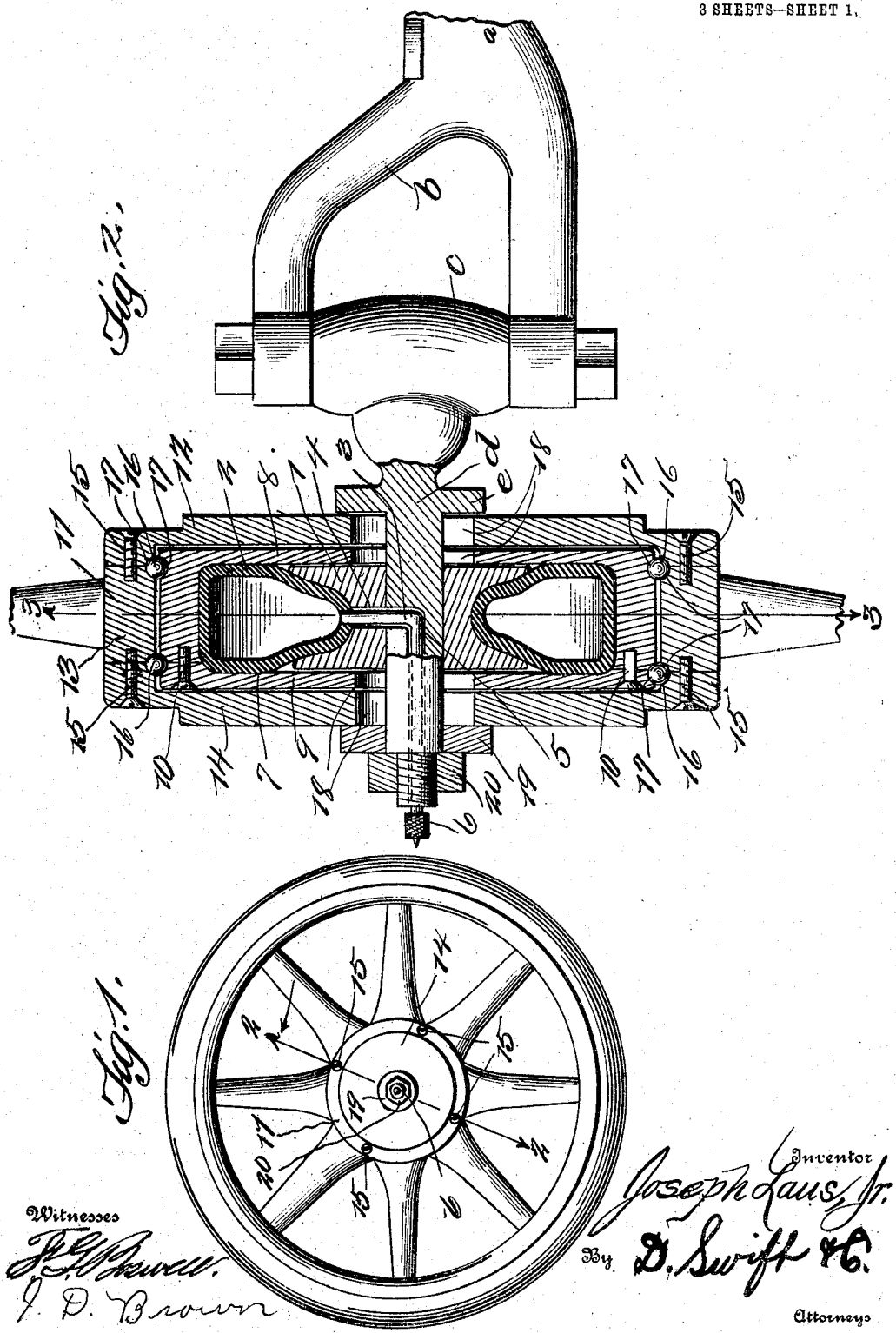

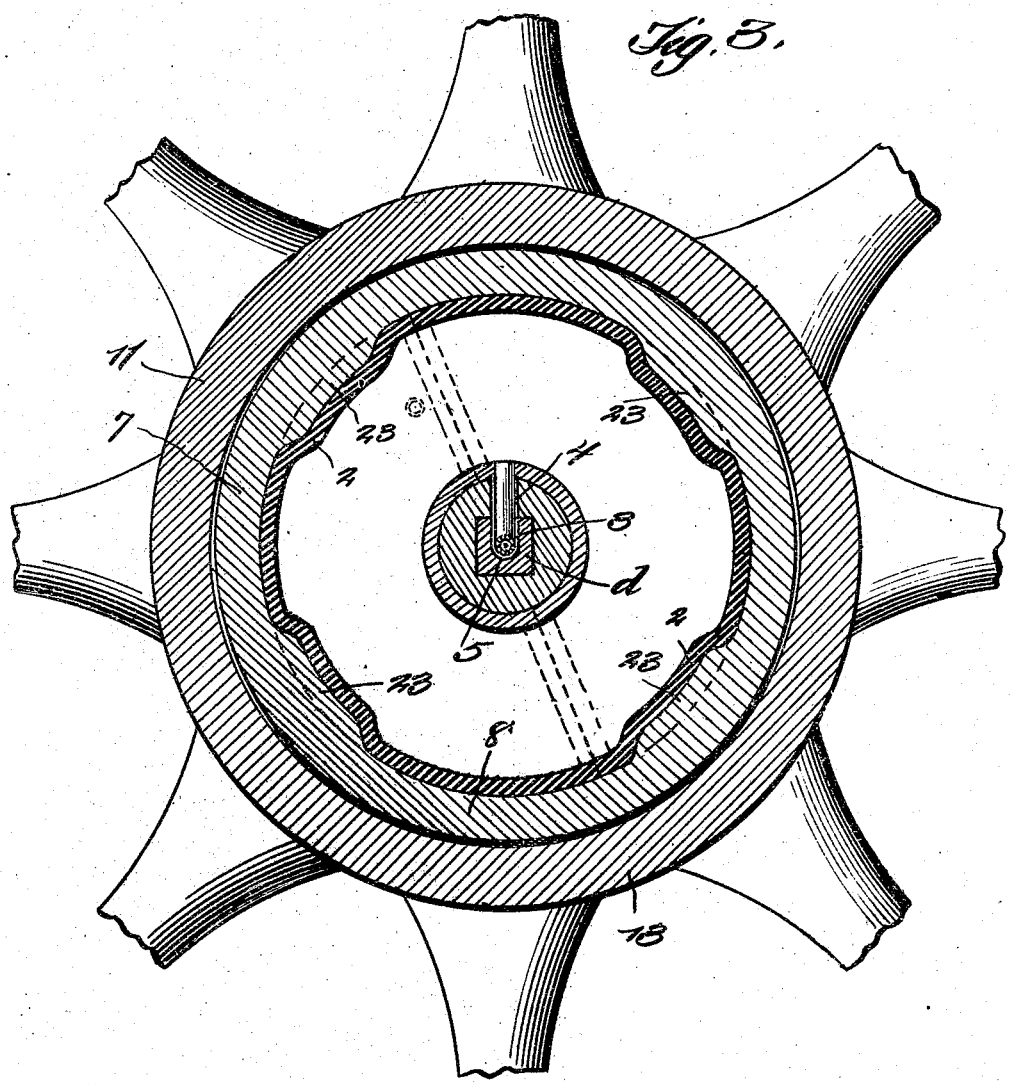

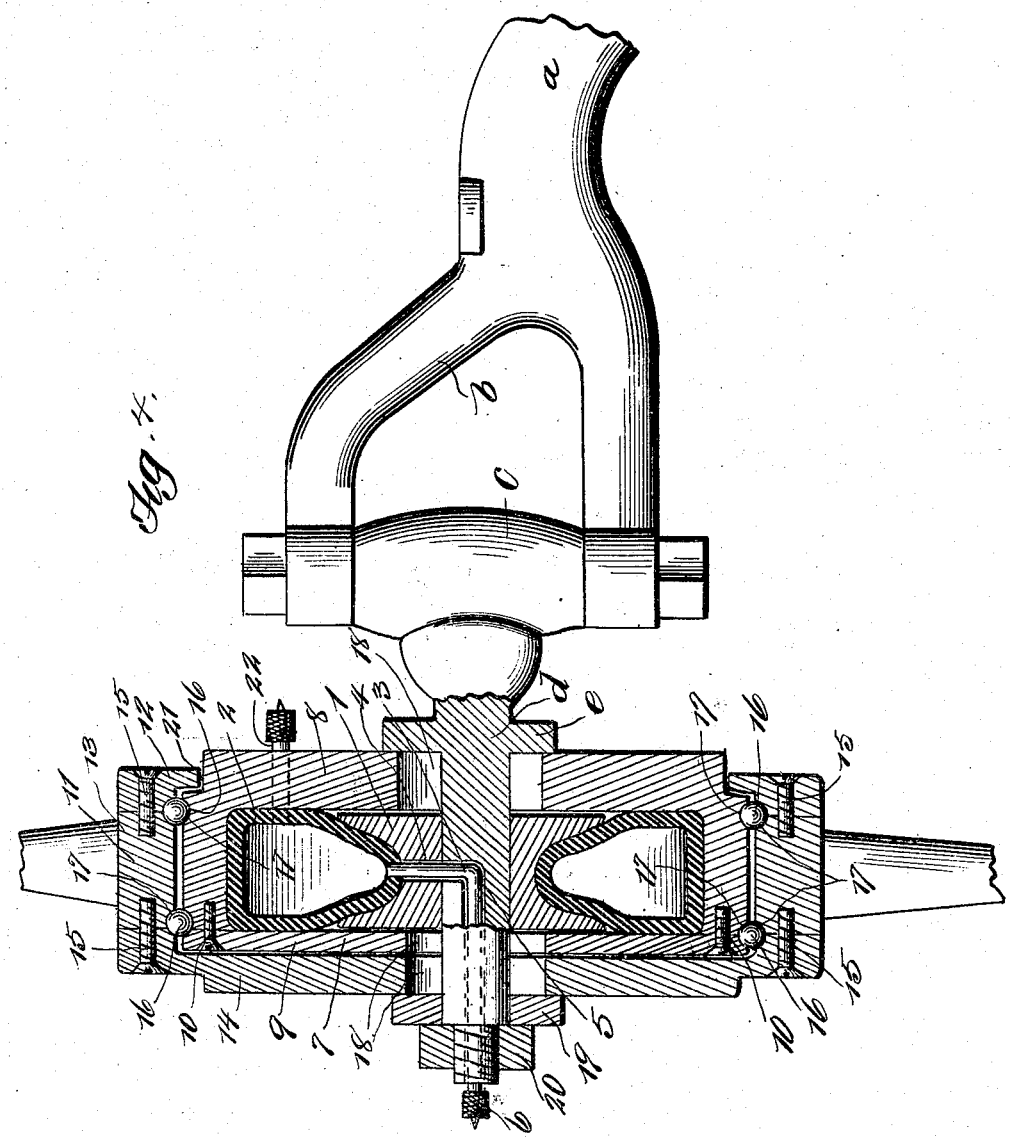

JOSEPH LAUS, JR., OF OSHKOSH, WISCONSIN.

AUTOMOBILE-WHEEL.

No. 899,876.
Specification of Letters Patent.
Patented Sept. 29, 1908.

Application filed March 11, 1908. Serial No. 420,308.

*To all whom it may concern:*

Be it known that I, JOSEPH LAUS, Jr., a citizen of the United States, residing at Oshkosh, in the county of Winnebago and State of Wisconsin, have invented a new and useful Automobile-Wheel; and I do hereby declare the following to be a full, clear, and exact description of the invention, such as will enable others skilled in the art to which it appertains to make and use the same.

The invention about to be set forth and claimed pertains to a new and useful vehicle wheel having a cushioned hub and particularly adapted for use upon automobiles.

The invention in its broadest scope aims for its primary and essential object to provide a wheel having its hub portion provided with an interior spool shaped hub member, fixed adjacent to and immovable upon the axle of an automobile, an interior shell or casing immovably positioned adjacent to the hub member and an interior annular cushion interposed between the shell or casing and said hub member and inflated preferably through the spindle or stub of the axle, but, if it is desired, the inflation of the cushion may be accomplished, as shown in a modified form of the invention. The hub member, shell or casing and cushion are inclosed by an exterior casing or shell, as clearly shown in the drawings.

This invention comprises further objects and combinations of elements which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice, with the understanding that the changes and variations accruing from said reduction to practice are limited to the scope of the appended claims.

To obtain a full and correct understanding of the details of construction, combinations of features, elements and advantages, reference is to be had to the hereinafter set forth description and the accompanying drawings in connection therewith, wherein Figure 1 is a side elevation of a complete automobile wheel, showing in elevation the exterior of the hub portion thereof, which constitutes the invention. Fig. 2 is a sectional view upon line 2—2 of Fig. 1, showing in section the interior parts of the hub portion of the wheel. Fig. 3 is a sectional view on line 3—3 of Fig. 2. Fig. 4 is a view of a modified form of the construction of the hub portion of the wheel, showing the inflation of the interior pneumatic cushion, accomplished through the shell or casing inclosing the spool shaped hub member and said cushion.

In regard to the drawings wherein similar reference characters indicate corresponding parts in the several illustrations, by figures and letters, $a$ designates an axle of an automobile having forked ends $b$, but only one forked end being shown, in which is pivoted a member $c$ having a stub or spindle $d$ projecting laterally therefrom, as clearly shown in Fig. 2 of the drawings. This stub or spindle $d$ is square in cross section, as shown in Fig. 3, and positioned immovably, that is, rotatably immovable, is an interior spool shaped hub member 1, about the circumference of which a pneumatic cushion or tube 2 is positioned, which may be formed in one piece or two, as desired, as shown.

In Figs. 1, 2 and 3 the pneumatic cushion or tube is inflated through the stub or spindle $d$ of the axle, by means of a tube 3 which is connected to and extends from said pneumatic cushion, through an aperture 4 of the said spool shaped hub and through the elongated recess or groove 5, of the said stub or spindle, as clearly shown; this tube 3 extends to and through the outer exterior end of the said stub or spindle, and is provided with the usual cap valve 6. This cap valve forms no part of the present invention, that is, as far as the construction thereof is concerned. Inclosing the pneumatic cushion and spool shaped hub is a shell or casing 7 comprising two members 8 and 9, for the purpose of assembling the same about said cushion and spool shaped hub; these two members 8 and 9 are secured together by suitable screws 10, or any other suitable means may be utilized. Inclosing the shell or casing 7, the cushion and said spool shaped hub is an exterior shell or casing 11 comprising three members 12, 13 and 14, all of which are designed for the express purpose of assemblage about the casing 7, cushion and said spool shaped hub. These members 12, 13 and 14 are secured together by screws or other fastening means 15, as clearly shown. A further purpose of forming the exterior and interior shells or casings is to allow the insertion of ball bearings 16, which allow an easy movement for the exterior casing. These ball bearings travel in annular raceways 17 of the interior and exterior shells or casings, as clearly shown. The interior and exterior casings are provided with bores 18 of equal diameter, but larger than the thickness of the stub or spindle of the axle, so as to allow movement, vertically, of the said exterior and interior casings, that is, in the rotary movement of the wheel and hub, especially when the periphery of the wheel encounters rough surfaces. To prevent inward movement of the hub of the wheel an integral flange or collar *e* is provided upon the stub or spindle *d* as shown, and to prevent outward displacement thereof a washer or member 19 and nut 20 are positioned upon the end of said stub or spindle.

In Fig. 4 of the drawings the interior shell or casing extends through the exterior casing upon one side thereof, as at 21, and the inflation of the pneumatic cushion is accomplished through the tube 22, which extends through the walls of the said interior shell or casing, as will be readily seen in Fig. 4 of the drawings.

From the foregoing, the essential features, elements and the operation of the device, together with the simplicity thereof, will be clearly apparent.

The said interior casing is provided with inwardly projecting members or enlargements 23, to engage the pneumatic cushion, so as to hold the cushion and the interior casing in an immovable position.

Having thus fully described the invention, what is claimed as new and useful, by the protection of Letters Patent, is:—

In a device as set forth, a hub, an axle stub or spindle therefor, an interior spool shaped hub member positioned rotatably immovable adjacent to and upon said spindle, a pneumatic cushion extending about said hub member, casings therefor, means to allow the cushion to be inflated through the said spindle, said casings having bores to allow sufficient movement therefor to relieve the jar upon a vehicle, said interior casing having inwardly projecting portions to engage said cushion to hold the cushion and interior casing against a lateral or rotary movement.

In testimony whereof I have signed my name to this specification in the presence of two subscribing witnesses.

JOSEPH LAUS, Jr.

Witnesses:
J. A. Voss,
H. M. Johnson.